United States Patent
Kajita et al.

(10) Patent No.: US 9,279,512 B2
(45) Date of Patent: Mar. 8, 2016

(54) CHECK VALVE

(71) Applicants: DENSO CORPORATION, Kariya, Aichi (JP); Advics Co., Ltd., Kariya, Aichi (JP)

(72) Inventors: Hidenobu Kajita, Obu (JP); Masaaki Omi, Anjo (JP)

(73) Assignees: DENSO CORPORATION, Kariya, Aichi-pref. (JP); ADVICS CO., LTD., Kariya (JP)

( * ) Notice: Subject to any disclaimer, the term of this patent is extended or adjusted under 35 U.S.C. 154(b) by 335 days.

(21) Appl. No.: 13/755,559

(22) Filed: Jan. 31, 2013

(65) Prior Publication Data

US 2013/0192697 A1 Aug. 1, 2013

(30) Foreign Application Priority Data

Jan. 31, 2012 (JP) ................................. 2012-018434

(51) Int. Cl.
*F16K 17/04* (2006.01)
*F16K 15/04* (2006.01)
*F16K 15/02* (2006.01)

(52) U.S. Cl.
CPC ........... *F16K 17/0433* (2013.01); *F16K 15/025* (2013.01); *F16K 15/044* (2013.01); *Y10T 137/785* (2015.04); *Y10T 137/7925* (2015.04)

(58) Field of Classification Search
CPC . F16K 17/0433; F16K 15/044; F16K 14/025; Y10T 137/785; Y10T 137/7925
USPC ........................................... 137/514.3, 514.5
See application file for complete search history.

(56) References Cited

U.S. PATENT DOCUMENTS

| 4,706,705 | A | 11/1987 | Lee, III |
| 6,435,848 | B1 | 8/2002 | Minami et al. |
| 6,622,752 | B2 * | 9/2003 | Kushida et al. ............ 137/539.5 |

(Continued)

FOREIGN PATENT DOCUMENTS

| CN | 1135312 | 1/2004 |
| JP | 52-014221 | 2/1977 |
| JP | 63-022473 | 2/1988 |
| JP | 09-020218 | 1/1997 |
| JP | 2000-346241 | 12/2000 |
| JP | 2001-050174 | 2/2001 |
| JP | 2009-210071 | 9/2009 |

OTHER PUBLICATIONS

Office action dated Jun. 3, 2014 in corresponding Japanese Application No. 2012-018434.

(Continued)

*Primary Examiner* — Marina Tietjen
*Assistant Examiner* — Daphne M Barry
(74) *Attorney, Agent, or Firm* — Harness, Dickey & Pierce, P.L.C.

(57) ABSTRACT

A valve member having a valve part and a piston part is accommodated in a piston accommodation cylinder part of a case reciprocatably, and a damper chamber that is substantially a sealed space is formed in an anti-valve seat side in the valve member so that fluid flows without flowing via the damper chamber. Accordingly, since the fluid does not pass through the damper chamber, a fluid force that occurs in the piston part due to a fluid flow does not change easily, thus it becomes difficult to increase hunting at the valve members. Moreover, in a vibrational component in the valve member reciprocating direction of the valve members, amplitude of the vibration can be decreased by a damping force generated in the damper chamber.

14 Claims, 3 Drawing Sheets

(56) References Cited

U.S. PATENT DOCUMENTS 6,805,157 B2 * 10/2004 Nakazawa et al. ............ 137/540
6,810,907 B2 * 11/2004 Hashimoto et al. ........ 137/514.5

OTHER PUBLICATIONS

Office action dated Jul. 31, 2014 in corresponding Chinese Application No. 201310037624.6.

* cited by examiner

CHECK VALVE

CROSS-REFERENCE TO RELATED APPLICATION

This application is based on and claims the benefit of priority from earlier Japanese Patent Application No. 2012-18434 filed Jan. 31, 2012, the description of which is incorporated herein by reference.

TECHNICAL FIELD

The present disclosure relates to a check valve that permits fluid to flow only in one-way.

BACKGROUND

A conventional check valve has a case where a fluid passage and a valve seat are formed, a valve member that touches and separates from the valve seat to open and close the fluid passage, and a spring that energizes the valve member in a valve-closing direction.

Further, the check valve is opened when an energization force of fluid in a valve opening direction exceeds an energization force of the spring in a valve closing direction (refer to Japanese Patent Application Laid-Open Publication No. 2001-50174, for example).

However, since an opposite side of the valve seat in the valve member serves as the fluid passage and the fluid flows along with the valve member in the conventional check valve, fluid force occurs parallel with a fluid flowing direction by the fluid flow during the check valve is opened (in other words, in a direction that the valve member reciprocates), thus the valve member easily hunts (i.e. undergoes oscillatory behavior of a non-converging feedback loop) in the valve member reciprocating direction.

Moreover, there is a problem that, due to the hunting of the valve member, pressure pulses occur, or noise occurs from apparatus and piping that vibrate due to the pressure pulses.

SUMMARY

An embodiment provides a check valve that prevents hunting of a valve member.

In a check valve according to a first aspect, the check valve includes a case member having an entrance-side fluid passage where fluid flows in, an exit-side fluid passage where fluid flows out, and a valve seat disposed in a downstream end of the entrance-side fluid passage are formed, a valve member that opens and closes a passage between the entrance-side fluid passage and the exit-side fluid passages by touching and separating from the valve seat, and is energized in a valve opening direction by a fluid force of the fluid from the entrance-side fluid passage, and a spring that energizes the valve member in a valve closing direction.

The check valve opens when the energization force in the valve opening direction by the fluid force exceeds the energization force in the valve closing direction by the spring.

The valve member has a piston part that reciprocates, and a valve part that is disposed in the valve seat side and touches and separates to the valve seat, the case member has a piston accommodation cylinder part that accommodates the piston part reciprocatably, there is provided a damper chamber that is formed by the valve member and the case member in an anti-valve seat side of the valve member, and generates damping force, and the fluid that flows through the exit-side fluid passage flows without flowing via the damper chamber.

Accordingly, since the fluid does not pass through the damper chamber, a fluid force that occurs in the piston part by a fluid flow does not change easily even if a flow rate changes by change of a valve opening angle, thus hunting is suppressed at the valve member.

Moreover, in a vibrational component in the valve member reciprocating direction among vibrational components of the valve member, amplitude of the vibration can be decreased by a damping force generated in the damper chamber.

Therefore, conjointly, the hunting at the valve member can be prevented, and generation of pressure pulses and noise caused by this pressure pulses can also be prevented.

In the check valve according to a second aspect, the piston part has a cylindrical or columnar shape, and an outer surface positioned in the valve part side from an intermediate position of the piston part in a reciprocating direction and another outer surface positioned in an anti-valve part side from the intermediate position of the piston part in a reciprocating direction contact to an inner surface of the piston accommodation cylinder part when the piston part inclines.

In the check valve according to a third aspect, a distance between the two outer surfaces of the piston part contacting the inner circumference side of the piston accommodation cylinder part in the valve member reciprocating direction is configured equal to or more than ⅔ of a diameter of the piston part.

In the check valve according to a fourth aspect, the spring is a coil spring, and the piston part has a spring accommodating recess that accommodates a part of the spring.

In the check valve according to a fifth aspect, the piston part and the valve part of the valve member are provided separately, and the valve part is held by the piston part in a state relatively movable to the piston part.

In the check valve according to a sixth aspect, the piston part has a valve part accommodating recess that accommodates a part of the valve part.

In the check valve according to a seventh aspect, the exit-side fluid passage has an exit-side fluid passage-in-the-pipe-part formed in a downstream side of the valve seat and in an inner circumference side of the piston accommodation cylinder part, and a through hole formed in the piston accommodation cylinder part that communicates between the outer surface side of the piston accommodation cylinder part and the exit-side fluid passage-in-the-pipe-part.

In the check valve according to an eighth aspect, there is provided a single through hole.

In the check valve according to a ninth aspect, the damper chamber is substantially a sealed space.

DETAILED DESCRIPTION OF THE PREFERRED EMBODIMENTS

Figure 1:
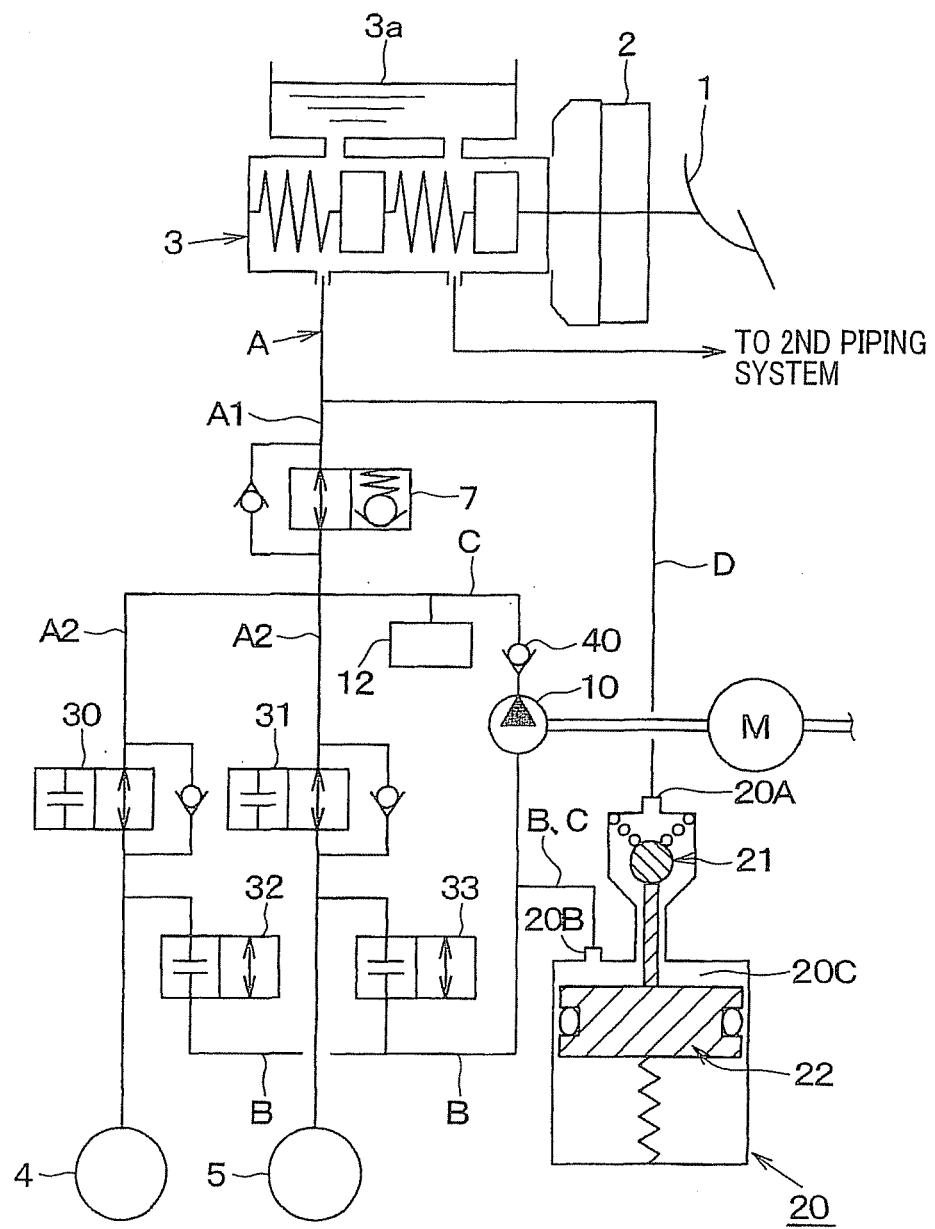
FIG. 1 shows a schematic piping diagram of a breaking device for vehicles to which a check valve regarding a first embodiment of the present disclosure is applied.

With reference to the drawings, hereinafter will be described embodiments of the present disclosure.

It should be appreciated that, in the following embodiments, components identical with or similar to those in the embodiments are given the same reference numerals for the sake of omitting explanation.

The First Embodiment

With reference to FIG. 1, a basic composition of a breaking device for vehicles of the present embodiment is explained.

However, a check valve in FIG. 1 is simplified in this regard and since a characterizing part of the present disclosure is not shown, the characteristic part will be explained with reference to FIG. 2 and FIG. 3 later.

In addition, a case where the breaking device in the present embodiment is applied to the vehicles that constitute an X piping hydraulic circuit that has each piping system of a front right wheel-rear left wheel and a front left wheel-rear right wheel is explained here.

As shown in FIG. 1, a brake pedal 1 stepped on by a driver as a braking member when applying a braking effort to the vehicle is connected with a servo unit 2, and a stepping force applied to the brake pedal 1 is boosted by the servo unit 2.

Further, the servo unit 2 has a pushrod etc. that transmits the boosted stepping force to a master cylinder (henceforth M/C) 3, and generates an M/C pressure by press-pushing a master piston disposed in the M/C 3 by the pushrod.

A brake fluid pressure generating means is constituted by the brake pedal 1, the servo unit 2, and the M/C 3.

In addition, a master reservoir 3a that supplies brake fluid into the M/C 3 or stores a surplus brake fluid in the M/C 3 is connected to the M/C 3.

The M/C pressure is transmitted to wheel cylinders (henceforth W/C) 4 and 5 of each wheel, i.e., a wheel braking force generating means, through an ABS actuator.

In addition, although only a first piping system that is connected with the W/C 4 for the front right wheel FR and the W/C 5 for the rear left wheel RL are shown in FIG. 1, it is considered that a second piping system connected with the front left wheel FL and the rear right wheel RR has the same structure as the first piping system.

The following explanation explains regarding the front right wheel FR and the rear left wheel RL side, however, it is completely the same also regarding the front left wheel FL and the rear right wheel RR that is the second piping system.

Moreover, the breaking device has a pipeline (main pipeline) A connected to the M/C 3.

The pipeline A has a differential-pressure-control valve 7, and the pipeline A is divided into two ways at a position of the differential-pressure-control valve 7.

Specifically, the pipeline A is divided into a pipeline A1 that receives the M/C pressure from the M/C 3 to the differential-pressure-control valve 7, and pipelines A2 from the differential-pressure-control valve 7 to each of the W/C 4 and 5.

The differential-pressure-control valve 7 controls a communicating condition and a differential pressure condition.

Although the differential-pressure-control valve 7 is usually kept to a communicated condition, the W/C 4 and 5 sides may be held to higher pressure than the M/C 3 side for predetermined difference pressure by switching the differential-pressure-control valve 7 to the difference pressure condition.

Furthermore, in the pipelines A2, the pipeline A is divided into two ways, and one of openings thereof is provided with a boost controlling valve 30 that controls a boost of the brake fluid pressure of the W/C 4, another one of the openings is provided with another boost controlling valve 31 that controls a boost of the brake fluid pressure of the W/C 5.

These boost controlling valves 30 and 31 are constituted as two-position valves that can control a communication and an interception conditions by an electrical control unit (henceforth ECU, not shown) for the brake fluid pressure control.

Further, when the two-position valve is open, the M/C pressure or the brake fluid pressure based on a discharge of a pump 10 (mentioned later), etc. can be added to each of the W/C 4 and 5.

These boost controlling valves 30 and 31 are always opened during a regular breaking period, i.e., the brake fluid pressure control of the ABS control etc. is not performed.

Moreover, pipelines B are connected to the pipelines A between the boost controlling valves 30 and 31, and each of the W/C 4 and 5, and the pipelines B are connected to a reservoir hole 20B of a pressure regulating reservoir 20.

Further, by making the brake fluid flow to the pressure regulating reservoir 20 through the pipelines B, the brake fluid pressure in the W/C 4 and 5 is suppressed, and each wheel can be prevented from locking.

Moreover, decompression controlling valves 32 and 33 that can control the communication and the interception conditions by the ECU are disposed on the pipelines B.

The decompression controlling valves 32 and 33 are always closed during the regular breaking period, and when making the brake fluid flow to the pressure regulating reservoir 20, they are suitably changed into the communicated condition.

The pipeline C is connected to the pipelines A between the differential-pressure-control valve 7 and the boost controlling valves 30 and 31, and the pipeline A and the reservoir hole 20B of the pressure regulating reservoir 20 are connected through the pipeline C.

The pump 10 and a check valve 40 (details are mentioned later) are disposed on the pipeline C, and in order to ease pulsation of the brake fluid that the pump 10 discharges, an accumulator 12 is disposed at the pipelines C in the downstream of the pump.

Moreover, a pipeline D is formed so as to connect a reservoir hole 20A and the M/C 3.

The pump 10 draws up the brake fluid in the pipeline A1 through the pipeline D and the pressure regulating reservoir 20, and discharges the brake fluid into the pipeline A2 through a part of pipeline B and the pipeline C to increase the W/C pressure.

In addition, the pump 10 is driven when controlling brake assistant, traction, and skid prevention, for example.

The pressure regulating reservoir 20 is built in a housing of the ABS actuator, and the reservoir chamber 20C is formed in the housing.

The reservoir chamber 20C is a chamber that stores the brake fluid flowed through the reservoir holes 20A and 20B, and sends out the brake fluid through the reservoir hole 20B.

A piston 22 is accommodated in the reservoir chamber 20C and reciprocates therein.

Moreover, the reservoir hole 20A has a valve part 21 that opens and closes the reservoir hole 20A.

Next, the composition of the check valve 40 mentioned above is explained based on FIG. 2 and FIG. 3.

Figure 2:
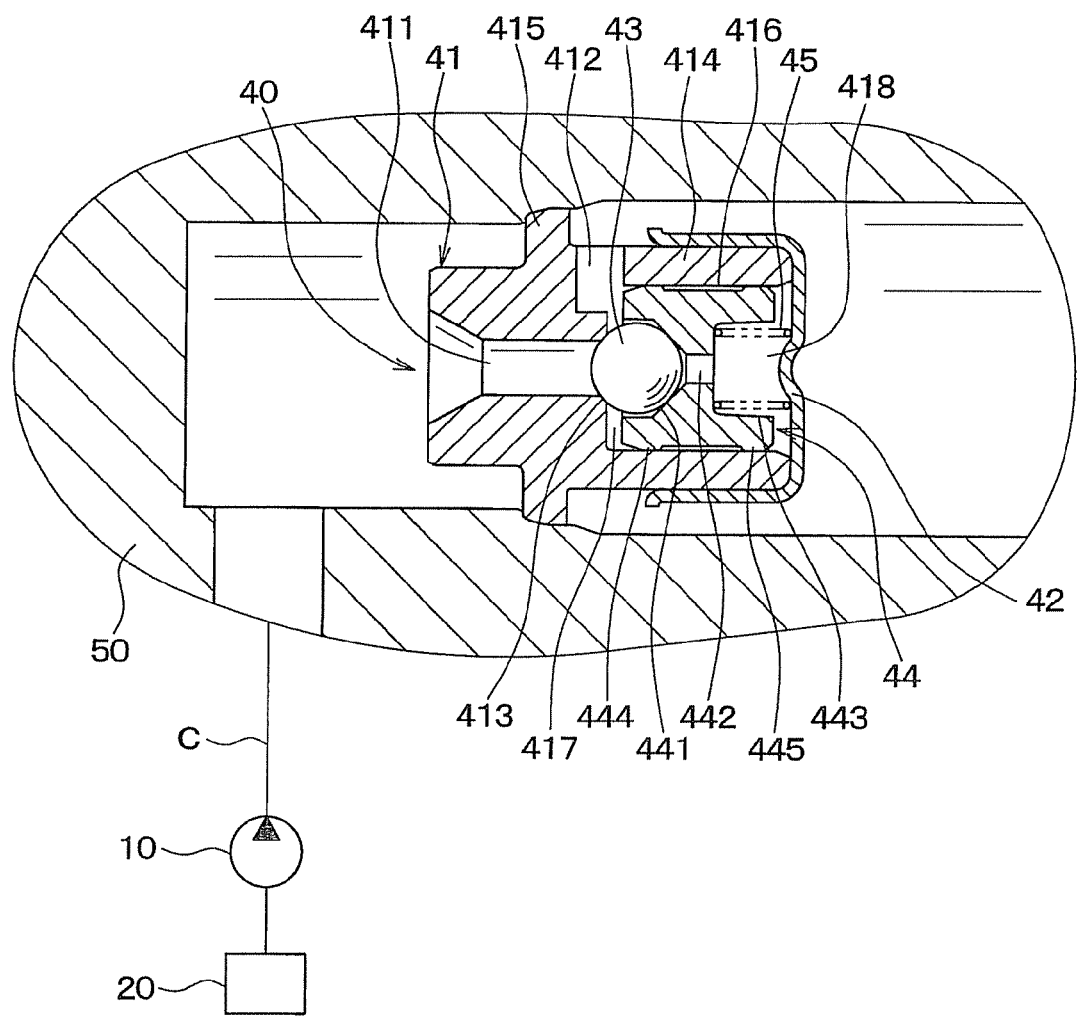
FIG. 2 shows a sectional view of the check valve of FIG. 1 in a closed-valve state.
Figure 3:
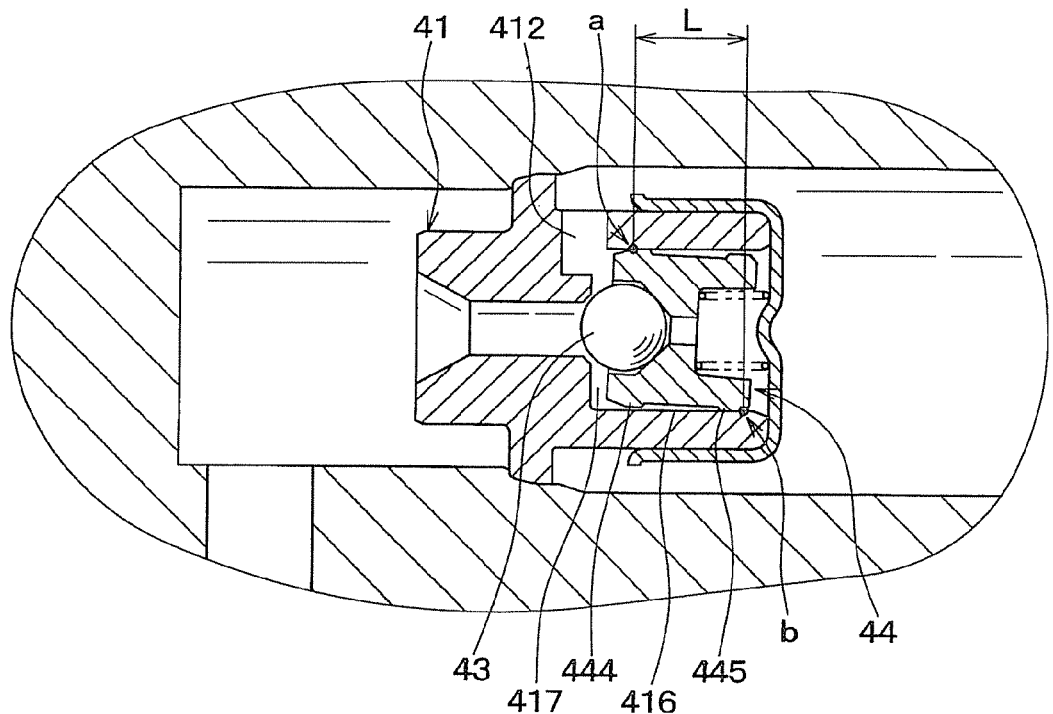
FIG. 3 shows a sectional view of the check valve of FIG. 1 in an opened-valve state.

In addition, FIG. 2 shows a sectional view of the closed check valve 40 of FIG. 1, and FIG. 3 shows a sectional view of the opened check valve 40 of FIG. 1.

The check valve 40 is used as a discharge valve of the pump 10 that sucks and discharges the brake fluid, and is built in the housing 50 of the ABS actuator.

The check valve 40 has a substantially cylindrical first case 41, a closed-bottomed cylindrical second case 42, a spherical valve part 43, a substantially cylindrical piston part 44, and a spring 45.

A valve seat etc. is formed in the first case 41. The second case 42 is fitted to the first case 41. The valve part 43 touches and separates with the valve seat to open and close a passage. The piston part 44 holds the valve part 43. The spring 45 energizes the valve part 43 and the piston part 44 in a valve-closing direction.

The spring 45 is a coil spring in particular.

In addition, the first case 41 and the second case 42 constitute a case member of the present disclosure.

Moreover, the valve part 43 and the piston part 44 constitute a valve member of the present disclosure.

In the following explanation, an axial direction of the first case 41 is simply called to an axial direction.

Moreover, a direction which intersects perpendicularly with the axial direction is simply called a radial direction.

The first case 41 is made of metal, and an entrance-side fluid passage 411 where the brake fluid flows in, a cylindrical piston accommodation cylinder part 414, a through hole 412 in the cylinder part 414 where the brake fluid flows out, a valve seat 413 disposed in a downstream end of the entrance-side fluid passage 411, and a flange part 415 projected outwardly from a perimeter surface in the radial direction are formed.

The second case 42 is press-fit onto an outer surface side of the piston accommodation cylinder part 414.

The flange part 415 is press-fit into the housing 50 of the ABS actuator.

The pipeline C is separated into the downstream side pipeline C of the check valve 40 and the upstream side pipeline C of the check valve 40 by the flange part 415.

The entrance-side fluid passage 411 is positioned in a central part in the radial direction and extended along with the axial direction.

Moreover, an entrance side end of the entrance-side fluid passage 411 is communicated to the upstream side pipeline C of the check valve 40, and the brake fluid discharged from the pump 10 flows in.

A guide hole 416 that is a cylindrical space where the piston part 44 slides is formed to an inner circumference side of the piston accommodation cylinder part 414.

The guide hole 416 is disposed coaxially with the entrance-side fluid passage 411.

Therefore, the piston part 44 reciprocates in the axial direction.

Moreover, the guide hole 416 is located in the downstream side of the valve seat 413, and is divided into an exit-side fluid passage 417 in the cylinder part 414 and a damper chamber 418 by the valve part 43 and the piston part 44.

In the following explanation, a reciprocating direction of the piston part 44 is called a valve member reciprocating direction.

The exit-side fluid passage 417 in the cylinder part 414 is a space between the valve seat 413, the valve part 43, and the piston part 44, and the brake fluid that passed through the entrance-side fluid passage 411 flows in.

The through hole 412 is extended in the radial direction, and only the single through hole 412 is formed in the piston accommodation cylinder part 414.

Further, an outer surface side of the piston accommodation cylinder part 414 and the exit-side fluid passage 417 in the cylinder part 414 are communicated by the through hole 412, and the brake fluid that passes through the exit-side fluid passage 417 in the cylinder part 414 flows into the through hole 412.

Moreover, an exit side end of the through hole 412 is communicated with the pipeline C in the downstream side of the check valve 40.

Therefore, the brake fluid that flows through the exit-side fluid passage 417 in the cylinder part 414 and the through hole 412 flows bypassing the damper chamber 418.

In addition, the through hole 412 and the exit-side fluid passage 417 in the cylinder part 414 constitute an exit-side fluid passage of the present disclosure.

The damper chamber 418 is a space located in an anti-valve seat side of the valve part 43 and the piston part 44, and is formed by the piston accommodation cylinder part 414 of the first case 41, a bottom of the second case 42, the valve part 43, and the piston part 44.

Moreover, between the damper chamber 418 and the exit-side fluid passage 417 in the cylinder part 414 is sealed by the valve part 43 and the piston part 44, and the damper chamber 418 is substantially a sealed space.

Furthermore, the spring 45 is disposed in the damper chamber 418.

A valve part accommodating recess 441, a communicating hole 442, and a spring accommodating recess 443 are formed in the piston part 44. The valve part accommodating recess 441 is formed in the valve seat 413 side of the piston part 44 and accommodates a part of the valve part 43. The communicating hole 442 communicates between the valve part accommodating recess 441 and the damper chamber 418. The spring accommodating recess 443 is formed in the anti-valve seat side of the piston part 44 and accommodates a part of the spring 45.

In addition, the spring accommodating recess 443 constitutes a part of the damper chamber 418.

A side of the valve part accommodating recess 441 near the valve seat 413 forms a cylindrical space, and the side far from the valve seat 413 forms a conical space.

Moreover, the valve part 43 accommodated in the valve part accommodating recess 441 is held in the state relatively movable to the piston part 44.

An annular first slide part 444 projecting outwardly in the radial direction is formed on an outer surface of the piston part 44, and is positioned in the valve part 43 side from an intermediate position of the piston part 44 in the reciprocating direction.

In addition, an annular second slide part 445 projecting outwardly in the radial direction is formed on the outer surface of the piston part 44, and is positioned in the anti-valve part side from the intermediate position of the piston part 44 in the reciprocating direction.

Further, the first slide part 444 and the second slide part 445 of the piston part 44 contact with the guide hole 416 and slide.

Moreover, as shown in FIG. 3, when the piston part 44 inclines, the piston part 44 and the guide hole 416 are being contacted at two points of two contacting points a and b.

Specifically, a valve part 43 side end of the first slide part 444 and an anti-valve part side end of the second slide part 445 contact to the guide hole 416.

Here, a distance L between the contacting points a and b in the valve member reciprocating direction is configured equal to or more than ⅔ of a diameter of the piston part 44.

Next, the operation of the check valve 40 is explained based on FIG. 2 and FIG. 3.

First, when the pump 10 is not driven, the valve part 43 and the piston part 44 move toward the valve seat 413 side by the energization force of the spring 45, as shown in FIG. 2, and the valve part 43 contacts to the valve seat 413 so that the check valve 40 is closed because energization force by fluid force in the valve opening direction does not act to the valve part 43.

When the pump 10 is driven, the brake fluid discharged from the pump 10 flows into the entrance-side fluid passage 411 through the pipeline C, and the valve part 43 is energized in the valve opening direction by the fluid force of the brake fluid.

When the energization force in the valve opening direction by the fluid force exceeds the energization force in a valve closing direction by the spring 45, as shown in FIG. 3, the valve part 43 and the piston part 44 move toward the anti-valve seat side so that the valve part 43 separates from the valve seat 413 and the check valve 40 is opened.

Since the valve part 43 is pressed on a conical surface of the valve part accommodating recess 441 by fluid force at this time, the valve part 43 is held stably at the piston part 44, and the valve part 43 and the piston part 44 operate unitarily.

Further, by opening the check valve 40, brake fluid flows into the exit-side fluid passage 417 in the cylinder part 414 and also to the through hole 412 from the entrance-side fluid passage 411, then flows into the outer surface side of the piston accommodation cylinder part 414, and flows into the downstream side of the check valve 40 of the pipeline C.

That is, the brake fluid that flows through the inside of the check valve 40 flows without flowing via the damper chamber 418.

Since the brake fluid does not pass through the damper chamber 418, the fluid force that occurs in the piston part 44 by the fluid flow does not change easily even if a flow rate changes due to a change of a valve opening angle, thus it becomes difficult to increase hunting (oscillatory behavior of a non-converging feedback loop) at the valve part 43 and the piston part 44.

Moreover, in a vibrational component in the valve member reciprocating direction among vibrational components of the valve part 43 and the piston part 44, amplitude of the vibration can be decreased by a damping force generated in the damper chamber 418, which is substantially the sealed space.

Therefore, the hunting at the valve part 43 and the piston part 44 can be prevented, and generation of pressure pulses and noise caused by this pressure pulses can also be prevented.

Moreover, since the outer surface of the piston part 44 and the guide hole 416 contact at two points, i.e. the valve part 43 side contacting point a and an anti-valve part side contacting point b when the piston part 44 inclines in the opened-valve state as shown in FIG. 3, the piston part 44 can be prevented from rolling, i.e., deviating from the reciprocating direction.

In other words, the piston part 44 can be prevented from being unsteady in a vertical direction relative to the valve member reciprocating direction.

Therefore, pressure pulses generated by rolling of the piston part 44 and the noise caused by this pressure pulses can be prevented.

Furthermore, since the distance L between the two contacting points a and b is lengthened enough as more than the diameter of the piston part 44, if the piston part 44 rolls, a drag in an opposite direction is generated and the rolling of the piston part 44 is prevented more reliably.

Moreover, since only the single through hole 412 is provided, the piston part 44 is energized in the fixed direction by the brake fluid that flows toward the through hole 412 from the exit-side fluid passage 417 in the cylinder part 414.

Therefore, the condition that the outer surface of the piston part 44 and the guide hole 416 being contacted in two points can be maintained stably, thus the rolling of the piston part 44 can be prevented more reliably.

Furthermore, since the spring accommodating recess 443 is formed in the piston part 44, the distance L between the two contacting points of the piston part 44 is secured greatly (i.e., securing the length of the piston part 44) while an accommodation space of the spring 45 is secured partially inside the piston part 44, thus enlargement of the entire check valve 40 in the axial direction can be suppressed.

The Second Embodiment

The second embodiment of the present disclosure is explained.

Figure 4:
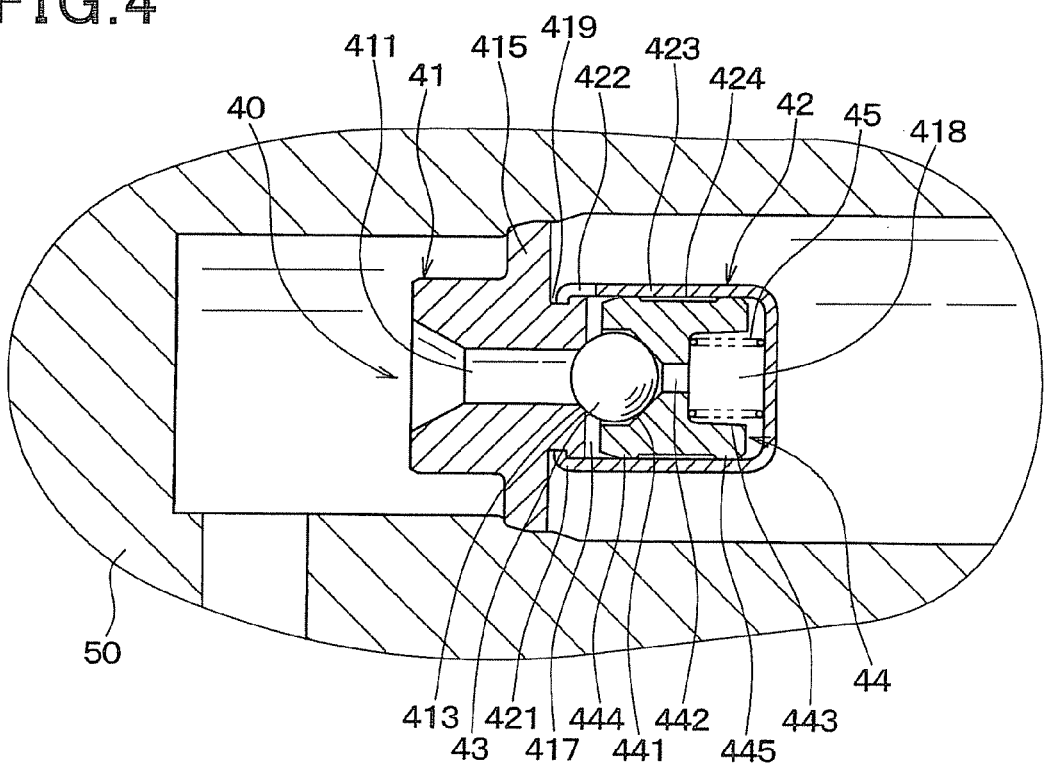
FIG. 4 shows a sectional view of the check valve regarding a second embodiment of the present disclosure.

FIG. 4 is a sectional view showing the check valve in the second embodiment of the present disclosure.

Hereinafter, only different parts from the first embodiment are explained.

As shown in FIG. 4, the through hole 412 (refer to FIG. 2) and the piston accommodation cylinder part 414 (refer to FIG. 2) are not provided for the first case 41.

An annular groove part 419 is formed on the perimeter of the first case 41.

An engaging part 421 projecting toward an inner side in the radial direction is formed on an opening end of the second case 42.

Further, the engaging part 421 is engaged with the groove part 419 so that the first case 41 and the second case 42 are unified.

A through hole 422 where the brake fluid flows out and a cylindrical piston accommodation cylinder part 423 that accommodates the piston part 44 reciprocatably therein is formed in the second case 42.

A guide hole 424 that is a cylindrical space where the piston part 44 slides is formed to an inner circumference side of the piston accommodation cylinder part 423.

The guide hole 424 is disposed coaxially with the entrance-side fluid passage 411.

The single through hole 422 is formed in the piston accommodation cylinder part 423.

Further, an outer surface side of the piston accommodation cylinder part 423 and the exit-side fluid passage 417 in the cylinder part 414 are communicated by the through hole 422, and the brake fluid that passed through the exit-side fluid passage 417 in the cylinder part 414 flows into the through hole 422.

Moreover, an exit side end of the through hole 422 is communicated with the pipeline C in the downstream side of the check valve 40.

Therefore, the brake fluid that flows through the exit-side fluid passage 417 in the cylinder part 414 and the through hole 422 flows without flowing via the damper chamber 418.

In addition, the through hole 422 and the exit-side fluid passage 417 in the cylinder part 414 constitute an exit-side fluid passage of the present disclosure.

The damper chamber 418 is formed by the piston accommodation cylinder part 423 of the second case 42, a bottom of the second case 42, the valve part 43, and the piston part 44.

When the pump 10 is driven, the valve part 43 is energized in the valve opening direction by the fluid force of the brake fluid discharged from the pump 10, and the check valve of the present embodiment opens.

Further, by opening the check valve 40, brake fluid flows into the exit-side fluid passage 417 in the cylinder part 414 and also to the through hole 422 from the entrance-side fluid passage 411, then flows into the outer surface side of the piston accommodation cylinder part 423, and flows into the downstream side of the check valve 40 of the pipeline C.

That is, the brake fluid that flows through the inside of the check valve 40 flows bypassing the damper chamber 418.

Therefore, like the first embodiment, the hunting at the valve part 43 and the piston part 44 can be prevented, and generation of pressure pulses and noise caused by this pressure pulses can also be prevented.

Moreover, since the outer surface of the piston part 44 and the guide hole 424 contact at two points when the piston part 44 inclines in the opened-valve state, the piston part 44 can be prevented from deviating from the reciprocating direction like the first embodiment.

Moreover, since only the single through hole 422 is provided, the piston part 44 is energized in the fixed direction by the brake fluid that flows toward the through hole 422 from the exit-side fluid passage 417 in the cylinder part 414.

Therefore, like the first embodiment, the condition that the outer surface of the piston part 44 and the guide hole 424 being contacted in two points can be maintained stably, thus the rolling of the piston part 44 can be prevented more reliably.

Other Embodiments

With each embodiment mentioned above, although the piston part 44 is made into a substantially cylindrical shape, the piston part 44 may be a substantially columnar shape without having the communicating hole 442 and the spring accommodating recess 443.

Moreover, with each embodiment mentioned above, although the check valve of the present disclosure is applied to the breaking device, the check valve of the present disclosure may be applicable to other uses.

Furthermore, combination is arbitrarily possible for each embodiment mentioned above in the range that can be performed.

What is claimed is:
1. A check valve comprising:
   a case member having an entrance-side fluid passage where fluid flows in, an exit-side fluid passage where fluid flows out, and a valve seat disposed in a downstream end of the entrance-side fluid passage;
   a valve member that opens and closes a passage between the entrance-side fluid passage and the exit-side fluid passages by touching and separating from the valve seat, the valve member being energized in a valve opening direction by a fluid force of the fluid from the entrance-side fluid passage; and
   a spring that energizes the valve member in a valve closing direction; wherein,
   the check valve opens when the energization force in the valve opening direction by the fluid force exceeds the energization force in the valve closing direction by the spring;
   the valve member has a piston part that reciprocates, and a valve part that touches and separates from the valve seat;
   the case member has a piston accommodation cylinder part that accommodates the piston part reciprocatably;
   the piston part has a valve part accommodating recess that accommodates a part of the valve part;
   the valve part is disposed in the valve part accommodating recess movably relative to the piston part, and is urged against a wall surface of the valve part accommodating recess by a pressure of the fluid from the entrance-side fluid passage;
   there is provided a damper chamber that is formed by the valve member and the case member in a side of the valve member opposite to the valve seat, fluid pressure in the damper chamber generates a damping force;
   the fluid that flows through the exit-side fluid passage flows without flowing into the damper chamber;
   the case member is disposed in a pipeline formed in a housing;
   the case member is provided with a flange part projected outwardly from a perimeter surface of the case member in a radial direction;
   the pipeline is separated into a downstream side pipeline of the check valve and an upstream side pipeline of the check valve by the flange part;
   the pipeline in the upstream side of the check valve is formed with a diameter smaller than a diameter of the flange part;
   the pipeline in the downstream side of the check valve is formed with a diameter larger than the diameter of the flange part; and
   a step portion where the flange part is press fit is formed in the pipeline between the upstream side of the check valve and the downstream side of the check valve.
2. The check valve according to claim 1, wherein;
   the piston part has a cylindrical or columnar shape; and
   an outer surface positioned in the valve part side from an intermediate position of the piston part in a reciprocating direction and another outer surface positioned in an anti-valve part side from the intermediate position of the piston part in a reciprocating direction contact to an inner surface of the piston accommodation cylinder part when the piston part inclines.
3. The check valve according to claim 2, wherein;
   a distance between the two outer surfaces of the piston part contacting the inner circumference side of the piston accommodation cylinder part in the valve member reciprocating direction is configured equal to or more than ⅔ of a diameter of the piston part.
4. The check valve according to claim 1, wherein;
   the spring is a coil spring; and
   the piston part has a spring accommodating recess that accommodates a part of the spring.
5. The check valve according to claim 1, wherein;
   the piston part and the valve part of the valve member are provided separately; and
   the valve part is held by the piston part in a state relatively movable to the piston part.
6. The check valve according to claim 1, wherein;
   the exit-side fluid passage has an exit-side fluid passage in the piston accommodation cylinder part formed in a downstream side of the valve seat and in an inner circumference side of the piston accommodation cylinder part, and a through hole formed in the piston accommodation cylinder part that communicates between the outer surface side of the piston accommodation cylinder part and the exit-side fluid passage in the piston accommodation cylinder part.
7. The check valve according to claim 6, wherein;
   there is provided a single through hole.
8. The check valve according to claim 1, wherein;
   the damper chamber is substantially a sealed space.
9. The check valve according to claim 1, wherein;
   the valve part accommodating recess has a tapered surface, and the valve part is contactable to the tapered surface.
10. The check valve according to claim 1, wherein;
    an annular slide part projecting outwardly in the radial direction is formed on an outer surface of the piston part.

11. The check valve according to claim 1, wherein;
the case member is fixed to the housing only in a position where the flange part is press fit to the step portion.

12. The check valve according to claim 1, wherein;
the pipeline formed in the housing has an upstream section upstream of entrance-side fluid passage and a downstream section downstream of the exit-side fluid passage; and
fluid in the upstream section directly engages an upstream surface of the flange part of the case member and fluid in the downstream section directly engages a downstream surface of the flange part of the case member.

13. The check valve according to claim 12, wherein the entire piston accommodation cylinder part of the case member is completely surrounded by the downstream section of the pipeline.

14. A check valve comprising:
a case member having an entrance-side fluid passage where fluid flows in, an exit-side fluid passage where fluid flows out, and a valve seat disposed in a downstream end of the entrance-side fluid passage;
a valve member that opens and closes a passage between the entrance-side fluid passage and the exit-side fluid passages by touching and separating from the valve seat, the valve member being energized in a valve opening direction by a fluid force of the fluid from the entrance-side fluid passage; and
a spring that energizes the valve member in a valve closing direction; wherein,
the check valve opens when the energization force in the valve opening direction by the fluid force exceeds the energization force in the valve closing direction by the spring;
the valve member has a piston part that reciprocates, and a valve part that touches and separates from the valve seat;
the case member has a piston accommodation cylinder part that accommodates the piston part reciprocatably;
the piston part has a valve part accommodating recess that accommodates a part of the valve part;
the valve part is disposed in the valve part accommodating recess movably relative to the piston part, and is urged against a wall surface of the valve part accommodating recess by a pressure of the fluid from the entrance-side fluid passage;
there is provided a damper chamber that is formed by the valve member and the case member in a side of the valve member opposite to the valve seat, fluid pressure in the damper chamber generates a damping force;
the fluid that flows through the exit-side fluid passage flows without flowing into the damper chamber;
the case member is disposed in a pipeline formed in a housing;
the case member is provided with a flange part projected outwardly from a perimeter surface of the case member in a radial direction;
the pipeline is separated into a downstream side pipeline of the check valve and an upstream side pipeline of the check valve by the flange part;
a step portion is formed in the pipeline of the housing;
the flange part directly engages the step portion;
a diameter of the pipeline upstream of the step portion is smaller than a diameter of the pipeline downstream of the step portion; and
the flanged part is press fit within the diameter of the pipeline downstream of the step portion.

* * * * *